United States Patent [19]

Prouteau et al.

[11] Patent Number: 4,934,098
[45] Date of Patent: Jun. 19, 1990

[54] SEALING AND GUIDE DEVICE FOR A SLIDING PANEL FOR CLOSING AN OPENING PROVIDED IN A HORIZONTAL WALL

[75] Inventors: Philippe Prouteau, Airvault; Jean-Marie Jeuffray, Bressuire, both of France

[73] Assignee: Ets Farnier & Penin, France

[21] Appl. No.: 363,890

[22] PCT Filed: Sep. 15, 1988

[86] PCT No.: PCT/FR88/00458
§ 371 Date: May 2, 1989
§ 102(e) Date: May 2, 1989

[87] PCT Pub. No.: WO89/02375
PCT Pub. Date: Mar. 23, 1989

[30] Foreign Application Priority Data

Sep. 18, 1987 [FR] France ................. 87 12966

[51] Int. Cl.⁵ .................... E05D 15/10; B60J 7/053
[52] U.S. Cl. ............................ 49/214; 49/408; 296/213; 296/222
[58] Field of Search ............... 49/408, 213, 209, 214; 296/216, 213, 222

[56] References Cited

U.S. PATENT DOCUMENTS

| | | | |
|---|---|---|---|
| 1,712,562 | 5/1929 | Jeffers | 49/214 |
| 4,043,590 | 8/1977 | Pizzuti | 296/222 |
| 4,426,112 | 1/1984 | Mori | 296/216 X |
| 4,811,985 | 3/1989 | Krüger et al. | 296/216 X |

FOREIGN PATENT DOCUMENTS

| | | |
|---|---|---|
| 2297151 | 8/1976 | France . |
| 2384640 | 10/1978 | France . |
| 2472705 | 7/1981 | France . |
| 2562134 | 10/1985 | France . |

OTHER PUBLICATIONS

Patent Abstracts of Japan, vol. 8, No. 274 (M-345) (1711), 14 Déc. 1984, and JP, A, 59143719 (MAZDA K.K.), 17 Aug. 1984.

*Primary Examiner*—Philip C. Kannan
*Attorney, Agent, or Firm*—Griffin, Branigan & Butler

[57] ABSTRACT

The sealing and guide device of the invention is characterized by the fact that, when the panel 7 is in its position for closing the opening 2, the sliding level determined between the slideways 3 and the skids 8 is lower than the level of the panel 7, so that there is a natural water flow slope (arrow A) extending sideways taking the water away from the gasket 12, which is compressed by the panel 7, said gasket being higher than the bodywork 1 around the opening 2 by virtue of the sliding level being offset relative to the panel 7.

4 Claims, 1 Drawing Sheet

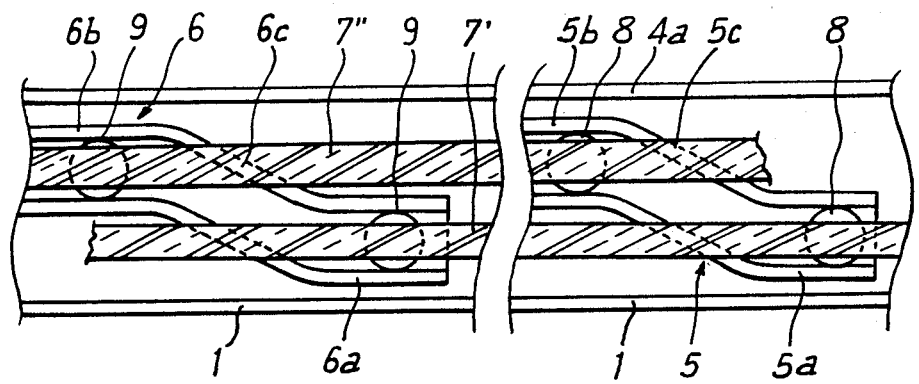
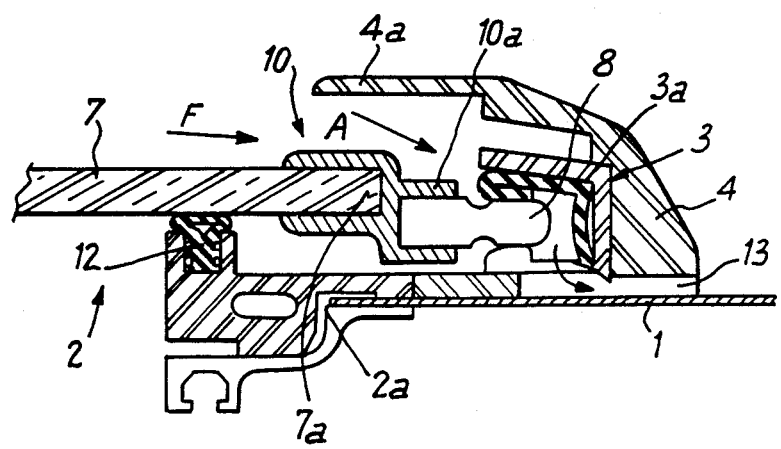

SEALING AND GUIDE DEVICE FOR A SLIDING PANEL FOR CLOSING AN OPENING PROVIDED IN A HORIZONTAL WALL

The present invention relates to a guide device for a sliding panel, such as a sliding panel in the roof of a motor vehicle, for guiding the panel over the edges of the opening in the top of the roof, and for improving sealing between panel and the top of the roof, when the panel is in its closing position.

In some cases, the panels of opening roofs are guided along shaped slideways which, on opening and on closing, enable the panel to be swung away from or towards the bodywork so as to enable the panel not only to slide over the bodywork, but also to press firmly against a gasket disposed around the opening by the panel moving vertically towards the bodywork as the roof is being closed. This swinging motion is obtained in conventional manner by the shape of the slideways in which the panel slides by means of lateral skids. In most cases, these skids are at the same level as the panel and as a result, when the panel is in its low position, its bottom face is situated no higher than the top face of the bodywork and it may be lower. It is then necessary for the sealing gasket which presses against the panel when in its closed position to be provided at a level which is lower than the level of the bodywork. Locations then necessarily exist between the panel and the slideways constituting pockets in which rainwater is retained, which water seeps, by capillarity, between the panel and the gasket at the lowest points of the water-retaining pockets.

The present invention seeks to provide an assembly which mitigates this drawback by implementing means for eliminating such rainwater retention spaces, thus allowing the water to escape freely.

To this end, the invention therefore provides a sealing and guide device for a panel sliding horizontally over an opening through a wall, the device being constituted by two slideways disposed along and above the lateral edges of the opening, with each of the slideways being constituted by two longitudinally successive parts, each receiving a guide skid fixed to the panel, each part comprising two portions at different distances from said wall and interconnected by a slope for imparting a swinging action to the panel on opening and closing, the device being further constituted by a sealing gasket facing upwards and disposed between the slideways to make contact with the panel when said skids are in those slideway portions which are closest to the wall.

According to one of the main characteristics of the invention, said guide skids are disposed in a plane different from the plane of the panel and beneath the panel, with said gasket then standing proud above the outside face of the wall.

In a preferred embodiment, the skids are coupled to the panel by means of a section bar fitted over the longitudinal edges of the panel and having a downwardly stepped outer section which is lower than its section fitted over the edge.

Finally, each slideway is coupled to the wall by means of a support which includes transverse evacuation channels in its base.

The invention will be better understood from the following description given purely by way of non-limiting example and also serving to show up secondary characteristics and advantages.

Reference is made to the accompanying drawing, in which:

FIG. 1 is a diagramatic representation of the conventional means used in the present invention for causing the closure panel to swing; and FIG. 2 is a cross-section view through one edge of the panel in its position for closing the opening in bodywork.

With reference to the figures, a horizontal wall 1 can be seen forming the top of a car roof, which top has an opening 2 of which only one edge 2a is shown in FIG. 2. Along this edge, which is a longitudinal edge of the opening, there is a slideway 3 which is generally U-shaped, having an internal lining 3a for facilitating panel sliding. The slideway is contained in a support 4 for fixing it to the vehicle bodywork and having a protective extension 4a which also serves to hide the slideway for reasons of appearance.

FIG. 1, which is a diagrammatic view as seen along arrow F of FIG. 2, shows that each slideway 3 is in fact constituted by two parts 5 and 6 longitudinally in succession along the edge 2a. Each of these parts is of substantially the same length as the panel 7, and at one end each part includes an end portion 5a or 6a which is closer to the bodywork 1 than is the remainder 5b or 6b of the length of the part. A slope 5c or 6c interconnects the two portions 5a and 5b or 6a and 6b. In the closure position 7', the panel 7 is held close to the bodywork by the portions 5a and 6a of the slideways by sliding skids 8 and 9 which are received in the slideways, said skids being fixed to the corresponding edge 7a of the panel. It can be seen that when the panel is displaced to the left of FIG. 1, the ramps 5c and 6c cause the panel to move away from the bodywork so as to enable it to slide freely towards the rear of the vehicle when in its position 7''.

FIG. 2, for example, is a section view of the device through portion 5a of the slideway, showing the opening 2 closed by the panel. The skids 8 and 9 are carried by a section bar 10 running along the edge of the panel 7 and having an outer section 10a for holding the skids at a lower level than the panel 7. Thus, even in position 7', the panel is at a distance from the bodywork, and the opening 2 can be surrounded by a sealing gasket 12 which stands proud above the level of the bodywork 1.

It can be seen that under these conditions, rainwater which reaches the slideway 3 flows away naturally downwards and outwards (arrow A) by virtue of the sliding plane being disposed at a level which is lower than the level of the top face of the panel 7, and this is in contrast to prior art devices where, because the level offset does not exist, water is constrained to flow inwardly and tends to engage the sealing between the panel and the gasket, accumulating between the slideway and the gasket.

In order to further improve lateral evacuation of the water, channels 13 are provided between the bodywork 1 and the slideway fixing support 4, thereby enabling the water to flow out. These channels 13 are provided through the support 4 and optionally through the sliding lining 3a.

The invention is particularly applicable to accessories for motor vehicles.

We claim:

1. A sealing and guide device for a panel (7) sliding horizontally over an opening (2) through a wall (1), the device being constituted by two slideways (3) disposed along and above the lateral edges (2a) of the opening (2), with each of the slideways being constituted by two longitudinally successive parts (5, 6), each receiving a guide skid (8, 9) fixed to the panel (7), each part (5, 6) comprising two portions (5a, 5b) (6a, 6b) at different distances from said wall (1) and interconnected by a slope (5c, 6c) for imparting a swinging action to the panel (7) on opening and closing, the device being further constituted by a sealing gasket (12) facing upwards and disposed between the slideways (3) to make contact with the panel (7) when said skids (8, 9) are in those slideway portions (5a, 6a) which are closest to the wall (1), the device being characterized in that said guide skids (8, 9) are disposed in a plane different from the plane of the panel (7) and beneath the panel, with said gasket (12) then standing proud above the outside face of the wall (1).

2. A device according to claim 1 or 2, characterized in that each slideway (3) is coupled to the wall (1) by means of a support (4) which includes water evacuation channels (13) in its base.

3. A device according to claim 1, characterized in that the skids (8, 9) are coupled to the panel (7) by means of a section bar (10) fitted over the longitudinal edges (7a) of the panel and having a downwardly stepped outer section (10a) which is lower than its section fitted over the edge (7a).

4. A device according to claim 3, characterized in that each slideway (3) is coupled to the wall (1) be means of a support (4) which includes water evacuation channels (1) in its base.

* * * * *